M. SCHNEBLE,

Assignor, by mesne assignments, to THE UNITED STATES METALLIC PACKING COMPANY.

Piston Packing.

No. 9,365. Reissued Aug. 31, 1880.

Witnesses.
E. O. Wood
Chas. Gottschall

Inventor,
Martin Schneble

UNITED STATES PATENT OFFICE.

MARTIN SCHNEBLE, OF DAYTON, OHIO, ASSIGNOR, BY MESNE ASSIGNMENTS, TO THE UNITED STATES METALLIC PACKING COMPANY, OF BOSTON, MASSACHUSETTS.

PISTON-PACKING.

SPECIFICATION forming part of Reissued Letters Patent No. 9,365, dated August 31, 1880.

Original No. 204,766, dated June 11, 1878. Application for reissue filed June 17, 1880.

*To all whom it may concern:*

Be it known that I, MARTIN SCHNEBLE, of Dayton, in the county of Montgomery and State of Ohio, have invented new and valuable Improvements in Piston-Rod Packing; and I do hereby declare that the following is a full, clear, and exact description of the construction and operation of the same, reference being had to the annexed drawings, making part of this specification, and to the letters and figures of reference marked thereon, in which—

Figure 1:
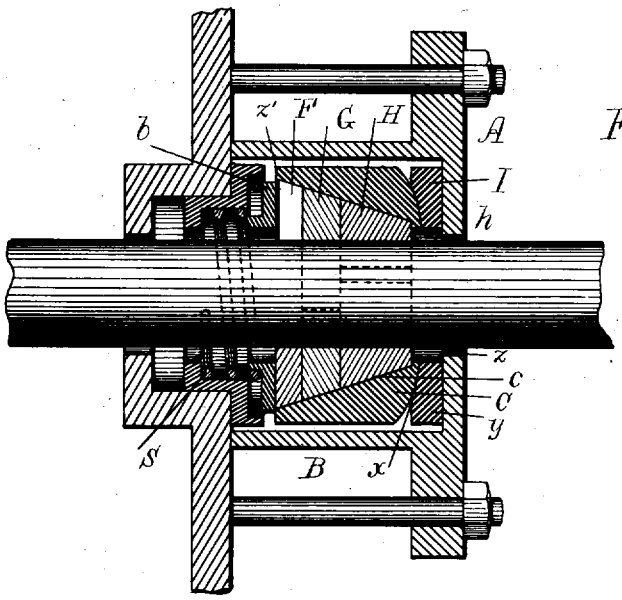
Figure 2:
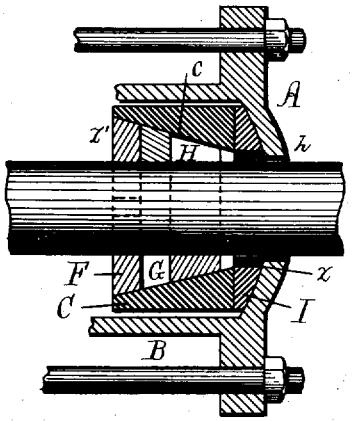
Figure 3:
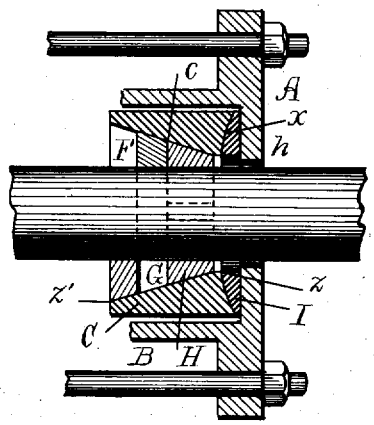

Figure 1 is an axial section of my packing-box for a steam-engine with my improvements attached. Figs. 2 and 3 are sectional views, showing different forms of the socket-ring and vibrating cup.

My present invention relates to certain new and useful improvements in self-adjusting packings for piston and other rods; and it consists in the construction, adaptation, and novel arrangement of the parts or elements of the combinations hereinafter shown and described.

In the annexed drawings, Fig. 1, A designates the stuffing-box of a steam-engine, to which, for convenience, my invention is represented as being applied; but it is obvious that in new engines this stuffing-box could be dispensed with and my improvement attached directly to the cylinder-head by any of the well-known means.

In Figs. 1, 2, 3, B designates a case or cover, in combination with which my invention is shown. When adapted to old engines this case is usually made of the same diameter of the flange of the well-known stuffing-box; but in new engines it would be made in proportion to the other parts, and of sufficient size for durability, strength, and convenience. In the edge of this case may be inserted a copper wire, to assist in forming a steam-tight joint between it and the flange or cylinder-head when attached by bolts or otherwise. The head-plate *h* of this case is provided with a central aperture for the passage of the rod, the opening being slightly greater than the diameter of the said rod, for the purpose of allowing the rod a degree of lateral play.

C designates a rocking cup, the exterior of which is somewhat smaller in diameter than the interior of the case, for the purpose hereinafter set forth. The interior of this cup C has a conical or tapering cavity extending from the rod-opening Z at one end toward the mouth Z′ at the other end, the enlargement being gradual, so that the hollow is tapering and gradually increasing toward the steam side, so that the steam which escapes from the cylinder into the case will serve to press the packing into the cavity and around the rod to pack the latter. Within this cup and around the rod the packing F G H is applied, the interior and exterior surfaces of which conform precisely to the shape of the rod and rocking cup, so that the central opening will form a cylindrical passage for the rod and the exterior surface fit closely within the cavity of the rocking cup, so that as the interior face is worn away by the action of the rod the packing will penetrate farther into the chamber and take up the waste, thereby maintaining a steam-tight joint.

The packing F G H is held in place by the follower-spring S, a follower-ring, *b*, being interposed to form an equable bearing upon the packing, the opposite end of this spring being inserted into the stuffing-box, or having a bearing against the cylinder-head or other fixed bearing, and readily adjusting itself to any slight movement of the parts. While this spring is not of absolute necessity when the engine is in operation, its function being in a measure served by steam escaping into the cavity of the case, it is important when the engine is at rest, or the case is empty of steam, or when the cylinder is in an upright position, as in a walking-beam marine engine.

Between the end of the rocking cup C and the head-plate of the case B is inserted the socket-ring I, having plano-concave or plano-convex surfaces. The face of this ring in contact with the cup is made spherically concave or spherically convex and the end of the cup accurately fitted thereto, thus accommodating any deviation of the piston-rod from the right line of its reciprocations and permitting the parts to have the universal motion of a ball-and-socket joint, as shown at *x*, Fig. 1. The face of this ring *y*, Fig. 1, in contact with the head-plate of the case B, is made plain and smooth, with ground surfaces, for the purpose of allowing a degree of play to the ring and rocking cup caused by any lateral deviation of the rod through wear of the cross-head or lost motion in any part of the machinery connected therewith, which may cause them to take out of the true line.

Figs. 2 and 3 are modifications or different forms of the socket-ring, showing that the construction need not be confined to the form previously described, as it is evident that the ball-and-socket joint could as well be formed with the head-plate and ring and the plane or sliding surface in contact with the rocking cup, or it could as well be made with the socket-joint reversed and in other forms that would allow the compound motion described, for the purpose set forth.

What I claim, and desire to secure by Letters Patent, is—

1. The rocking cup provided with segmental packing-rings, and having a central rod-opening expanding in wedge form toward the steam side, substantially as and for the purpose specified.

2. The combination of a rocking cup provided with segmental packing-rings, and having a central rod-opening, with a socket-ring having plano-concave or plano-convex surfaces, substantially as specified.

3. The universal rocking cup provided with a concave or convex surface at one end and a central rod-opening expanding toward the steam side, in combination with a socket-ring having plano-concave or plano-convex surfaces, substantially as specified.

4. The combination, with a segmental packing ring or rings, of a rocking bearing at one end and an elastic and yielding bearing at the other end of the box or case in which the packing-rings are arranged to work, substantially as specified.

5. The packing-receptacle provided with a universal rocking bearing and a plane or laterally-sliding bearing, substantially as described.

6. The universally-rocking packing-receptacle having a central rod-opening shaped to give a conical cavity around the rod for the packing, substantially as and for the purpose specified.

7. The combination of the universally-rocking packing-receptacle with a movable socket-ring having plano-convex or plano-concave surfaces, substantially as described.

8. The combination, with a packing-receptacle, of a universally-rocking bearing and an elastic or yielding bearing, substantially as described.

9. The combination, with a packing-receptacle, of a universally-rocking bearing, a sliding bearing, and an elastic or yielding bearing, substantially as described.

10. The combination of a piston or other rod and the packing for the same with a ball-and-socket joint so constructed and applied that the rod may either deviate from the right line or change the plane of its reciprocations in any direction by a rocking or a lateral sliding movement, substantially as described.

MARTIN SCHNEBLE.

Witnesses:
E. O. WOOD,
O. M. GOTTSCHALL.